United States Patent
Noh et al.

(10) Patent No.: US 12,190,531 B2
(45) Date of Patent: Jan. 7, 2025

(54) IMAGE PROCESSING METHOD AND DEVICE THEREOF

(71) Applicant: KOREA ADVANCED INSTITUTE OF SCIENCE AND TECHNOLOGY, Daejeon (KR)

(72) Inventors: Junyong Noh, Daejeon (KR); Julie Alfonsine E. Lelong, Daejeon (KR); Bumki Kim, Daejeon (KR); Hanui Lee, Daejeon (KR); Gukho Kim, Daejeon (KR); Mohammad Reza Karimi Dastjerdi, Daejeon (KR); Allen Kim, Daejeon (KR); Jiwon Lee, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 187 days.

(21) Appl. No.: 17/424,811

(22) PCT Filed: Feb. 21, 2019

(86) PCT No.: PCT/KR2019/002122
§ 371 (c)(1),
(2) Date: Jul. 21, 2021

(87) PCT Pub. No.: WO2020/171257
PCT Pub. Date: Aug. 27, 2020

(65) Prior Publication Data
US 2022/0092796 A1 Mar. 24, 2022

(51) Int. Cl.
*G06K 9/00* (2022.01)
*G06T 5/77* (2024.01)
(Continued)

(52) U.S. Cl.
CPC ............... *G06T 7/277* (2017.01); *G06T 5/77* (2024.01); *G06T 7/97* (2017.01); *G06T 2207/10016* (2013.01)

(58) Field of Classification Search
CPC .......... G06T 7/277; G06T 5/005; G06T 7/97; G06T 2207/10016
See application file for complete search history.

(56) References Cited

U.S. PATENT DOCUMENTS

| | | | |
|---|---|---|---|
| 2014/0254882 | A1 | 9/2014 | Jin et al. |
| 2016/0163022 | A1* | 6/2016 | Peleg ............... G11B 27/00 382/294 |
| 2017/0295359 | A1* | 10/2017 | Cabral ............... H04N 13/156 |

FOREIGN PATENT DOCUMENTS

| | | |
|---|---|---|
| JP | 2015-233212 A | 12/2015 |
| KR | 100946707 B1 | 3/2010 |

(Continued)

OTHER PUBLICATIONS

Xu, Binbin, et al. "Optical flow-based video completion in spherical image sequences." 2016 IEEE International Conference on Robotics and Biomimetics (Robio). IEEE, 2016.*

(Continued)

*Primary Examiner* — Gregory A Morse
*Assistant Examiner* — Owais Iqbal Memon
(74) *Attorney, Agent, or Firm* — Workman Nydegger

(57) ABSTRACT

An image processing device according to one embodiment estimates first optical flow information of a pixel unit on the basis of consecutive frames, and estimates a polynomial model corresponding to the optical flow information. The image processing device estimates second optical flow information of holes included in the frames on the basis of the (Continued)

polynomial model, and inpaints an input image on the basis of the first optical flow information and/or the second optical flow information.

16 Claims, 6 Drawing Sheets

(51) Int. Cl.
*G06T 7/00* (2017.01)
*G06T 7/277* (2017.01)

(56) References Cited

FOREIGN PATENT DOCUMENTS

| KR | 101241813 B1 | 3/2013 |
| KR | 101854612 B1 | 5/2018 |
| KR | 2018-0119696 A | 11/2018 |

OTHER PUBLICATIONS

Xu, Binbin, et al. "Optical flow-based video completion in spherical image sequences." 2016 IEEE International Conference on Robotics and Biomimetics (Robio). IEEE, 2016. (Year: 2016).*
International Search Report dated Nov. 27, 20219, issued in PCT Application No. PCT/KR2019/002123, filed Feb. 21, 2019.
Written Opinion dated Nov. 27, 20219, issued in PCT Application No. PCT/KR2019/002123, filed Feb. 21, 2019.
Binbin Xu et al., *Optical Flow-Based Video Completion in Spherical Image Sequences*, IEEE Transactions on Circuits and Systems for Video Technology, Dec. 3, 2016, pp. 1-8.

* cited by examiner

IMAGE PROCESSING METHOD AND DEVICE THEREOF

TECHNICAL FIELD

Example embodiments relate to an image processing method and device, and more particularly, to a method of inpainting an image in a spherical coordinate system based on a polynomial model using sequential frame data.

BACKGROUND ART

The recent emergence of various virtual reality (VR) 360-degree (°) panorama cameras has facilitated the capturing and production of 360° panorama videos. However, such panoramic capturing is performed by capturing an image omnidirectionally at 360° one time, and thus capturing staff and/or devices may inevitably be included in a captured image. Thus, a correction may be required after the capturing.

DISCLOSURE OF INVENTION

Technical Goals

An aspect provides an image processing method and device that easily removes an object from a 360-degree (°) panorama image through a two-dimensional (2D) polynomial model estimation of optical flow information using sequential frame image information and reconstructs an image through tracking of the object in frames based on reconstructed optical flow information, thereby reducing time and production costs for editing panorama image contents.

Technical Solutions

According to an example embodiment, there is provided an image processing method including receiving an input image of sequential frames, estimating first optical flow information of a pixel unit based on the frames, estimating a polynomial model corresponding to the first optical flow information, estimating second optical flow information of a hole in the frames based on the polynomial model, and inpainting the input image based on at least one of the first optical flow information and the second optical flow information.

The estimating of the polynomial model may include estimating a correlation coefficient in the polynomial model based on a motion pattern corresponding to a coordinate system of the input image and the first optical flow information.

The polynomial model may be modeled as a product of a matrix corresponding to the motion pattern and a vector corresponding to the correlation coefficient.

The estimating of the correlation coefficient may include estimating the correlation coefficient such that a difference between a value of the polynomial model and a value of the first optical flow information is minimized.

The inpainting may include backtracking a value of a pixel corresponding to the hole based on at least one of the first optical flow information and the second optical flow information.

The hole may correspond to a region removed from the input image.

The image processing method may further include extracting feature points from the frames, and removing a rotation between the frames by matching the feature points between the frames.

The image processing method may further include generating inpainting mask data indicating the hole based on the frames. The inpainting may include inpainting the input image based further on the inpainting mask data.

The estimating of the first optical flow information may include estimating a vector indicating an optical flow between a pixel in one frame of the frames and pixels in remaining frames excluding the one frame, the vector corresponding to the pixel in the one frame.

The input image may include 360-degree (°) panorama video data.

According to another example embodiment, there is provided an image processing device including a receiver configured to receive an input image of sequential frames, an estimator configured to estimate first optical flow information of a pixel unit based on the frames, estimate a polynomial model corresponding to the first optical flow information, and estimate second optical flow information of a hole in the frames based on the polynomial model, and an inpainter configured to inpaint the input image based on at least one of the first optical flow information and the second optical flow information.

The estimator may estimate the polynomial model by estimating a correlation coefficient in the polynomial model based on a motion pattern corresponding to a coordinate system of the input image and the first optical flow information.

The inpainter may backtrack a value of a pixel corresponding to the hole based on at least one of the first optical flow information and the second optical flow information.

The image processing device may further include a preprocessor configured to remove a rotation between the frames by extracting feature points from the frames and matching the feature points between the frames.

The inpainter may inpaint the input image based further on inpainting mask data indicating the hole.

The estimator may estimate the first optical flow information by estimating a vector indicating an optical flow between a pixel in one frame of the frames and pixels of remaining frames excluding the one frame, the vector corresponding to the pixel in the one frame.

BEST MODE FOR CARRYING OUT THE INVENTION

Figure 1:
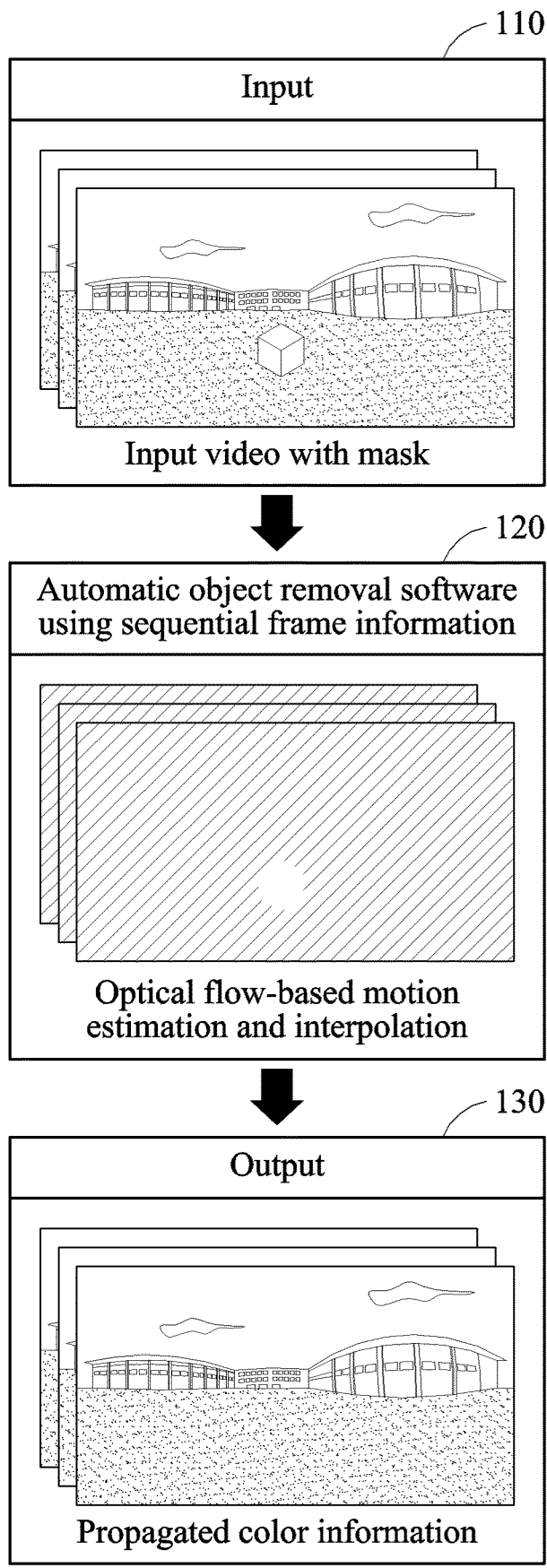
FIG. 1 is a diagram illustrating an example of an image processing method according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings, and like reference numerals in the drawings refer to like elements throughout.

FIG. 1 is a diagram illustrating an example of an image processing method according to an example embodiment.

Referring to FIG. 1, an input image 110 may include a plurality of sequential frames. For example, the input image 110 may be 360-degree (°) panorama video data. Software 120 may remove an object automatically using sequential frame information. The software 120 may estimate an optical flow-based motion and interpolate an optical flow of a hole corresponding to a target object to be removed, or a removal target object hereinafter. As a result, an image inpainted by color information propagated based on the estimated optical flow may be output as an output image 130. The image processing method described herein may be performed by an image processing device. The image processing device may be implemented by one or more software modules or one or more hardware modules, or various combinations thereof.

An automatic object removal technology using sequential frame information according to an example embodiment may be performed through the following operations.

1) For a 360° image from which an object is to be removed, an operation of generating a mask of a removal region and removing color information of the region 2) An operation of performing optical flow-based motion estimation using color information with the mask region removed and interpolating optical flow information of the mask region using a linear equation 3) An operation of filling a hole by backtracking color information of the removed region based on the interpolated optical flow information According to example embodiments described herein, it is possible to remove an object from a high-resolution (e.g., of 4K quality) 360° image, with relatively high quality (e.g., an average accuracy of 10 root-mean-square error (RMSE) or less). It is also possible to apply a two-dimensional (2D) polynomial model irrespective of the magnitude of a resolution, thereby increasing applicability.

The example embodiments may be applicable to the contents business and may thus contribute to the effective production of virtual reality (VR) contents in terms of the following aspects.

1) In the case of VR capturing devices or equipment, an image of an unnecessary or undesired object may also be captured in a process of capturing an image of a wide field of view (FOV).

2) In such a case, by estimating optical flow information from sequential frame information and applying a 2D polynomial model estimation thereto, reconstruction and removal of a desired object may be performed.

3) The inpainting technology described herein may be a fundamental technology that is employed to increase a degree of freedom (DOF) for editing a panorama image and may thus be highly applicable in a technical manner.

Figure 2:
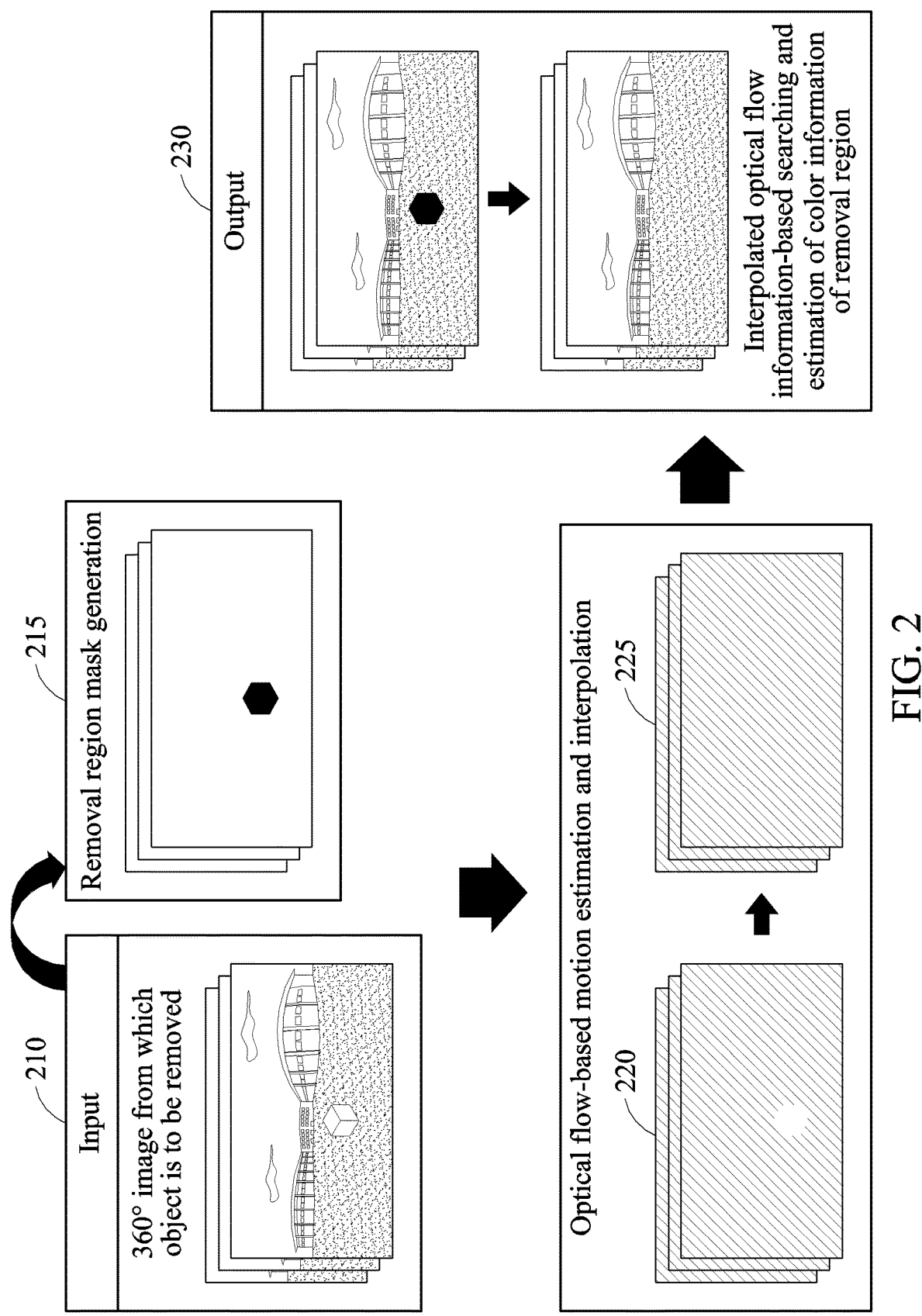
FIG. 2 is a diagram illustrating an example of a method of removing an object using sequential frames according to an example embodiment.

FIG. 2 is a diagram illustrating an example of a method of removing an object using sequential frames according to an example embodiment.

Referring to FIG. 2, an input image 210 may include an object to be removed therefrom. The image processing device may generate a removal region mask 215 from the input image 210. For example, the removal region mask 215 may correspond to bitmap data corresponding to each frame, and the bitmap data may indicate a removal region in a pixel unit.

The image processing device may generate first optical flow information 220 by performing optical flow-based motion estimation on the input image 210. The first optical flow information 220 may include vectors indicating an optical flow of pixels in a region excluding a hole corresponding to the removal region. The first optical flow information 220 may be determined by estimating an optical flow between a pixel in one frame and pixels in other frames.

The image processing device may estimate a polynomial model corresponding to the first optical flow information 220, interpolate the first optical flow information 220, and estimate second optical flow information of the hole. Interpolated optical flow information 225 may include the first optical flow information 220 and the second optical flow information. A detailed description of the polynomial model will be provided hereinafter.

The image processing device may search for and estimate color information of the hole corresponding to the removal region based on the interpolated optical flow information 225. The image processing device may then output an inpainted image 230.

Figure 3:
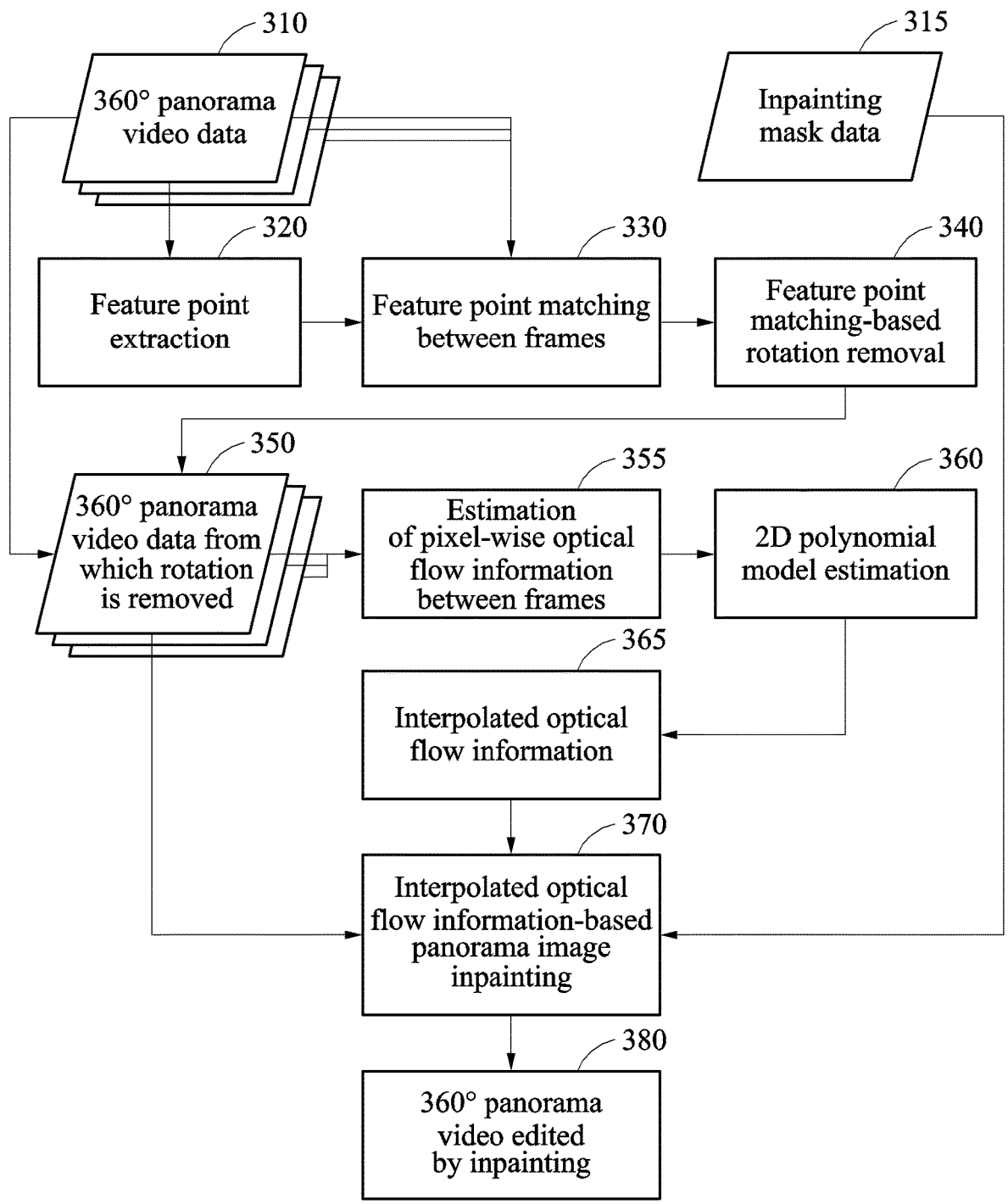
FIG. 3 is a flowchart illustrating an example of a method of inpainting a spherical coordinate system image based on a two-dimensional (2D) polynomial model estimation using sequential frame data information according to an example embodiment.

FIG. 3 is a flow chart illustrating an example of a method of inpainting a spherical coordinate system image based on 2D polynomial model estimation using sequential frame data information according to an example embodiment.

Referring to FIG. 3, the image processing device may perform inpainting editing on a 360° panorama video by estimating optical flow information between video frames and estimating a 2D polynomial model in the process described with reference to FIG. 3.

[Input]: The image processing device may receive, as an input, a 360° panorama input video I 310 and inpainting mask data $I_{mask}$ 315 that are in a standard panorama coordinate system. The input video 310 and/or the inpainting mask data 315 may be based on a coordinate system for representing a 360° image, for example, a spherical coordinate system with a horizontal rotation in a horizontal direction and a vertical rotation in a vertical direction. The image processing device may set a region for inpainting editing through the inpainting mask data 315.

Figure 4A:
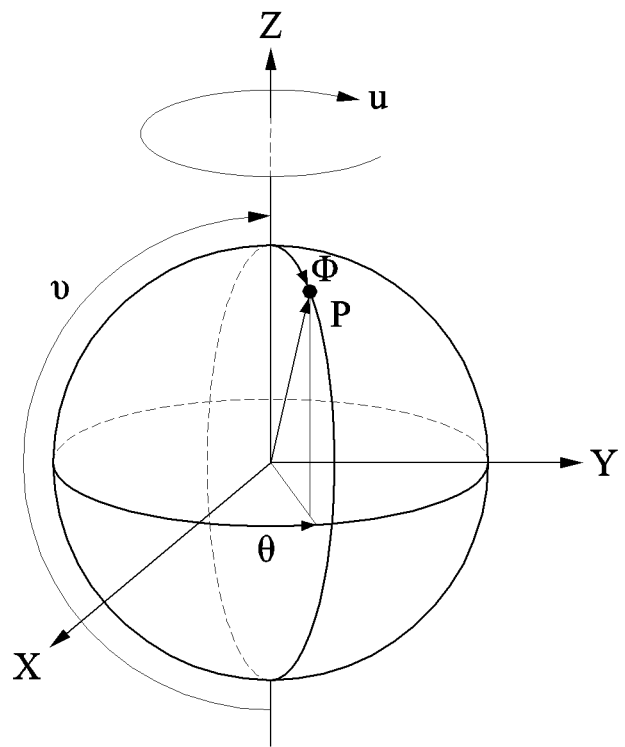
FIG. 4A is a diagram illustrating an example of a spherical coordinate system according to an example embodiment.
Figure 4B:
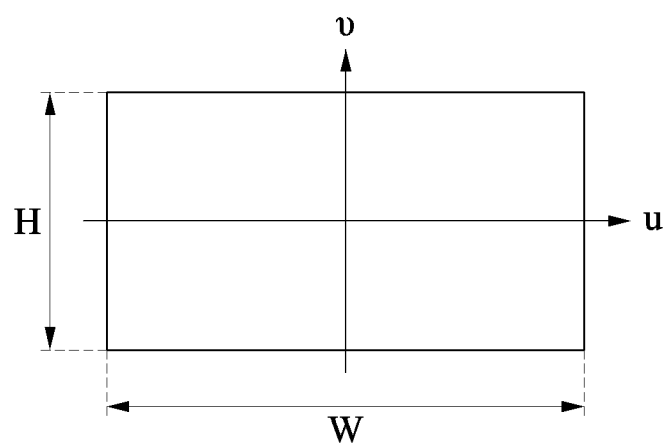
FIG. 4B is a diagram illustrating an example of a rectangular projection according to an example embodiment.

FIG. 4A is a diagram illustrating an example of a spherical coordinate system according to an example embodiment, and FIG. 4B is a diagram illustrating an example of a rectangular projection according to an example embodiment. A relationship between the spherical coordinate system in FIG. 4A and the rectangular projection in FIG. 4B may be expressed by Equation 1 below.

$$\theta = \frac{2\pi}{W}u, \phi = \frac{\pi}{H}v \qquad \text{Equation 1}$$

[Feature point matching-based removal of a rotation between frames]: The image processing device may extract feature points, for example, feature points X and X', from images of frames I in operation 320, and match X and X' in operation 330. The image processing device may then remove an image rotation by estimating a rotation transformation E between the frames and performing an inverse transformation in operation 340. X may indicate a feature point in one frame among the frames and X' may indicate a feature point in another frame among the frames. For example, an accelerated KAZE (A-KAZE) algorithm may be used to extract the feature points. A feature point matching relationship between X and X' may be expressed by Equation 2 below.

$$X^T E X = 0 \qquad \text{Equation 2}$$

Figure 5:
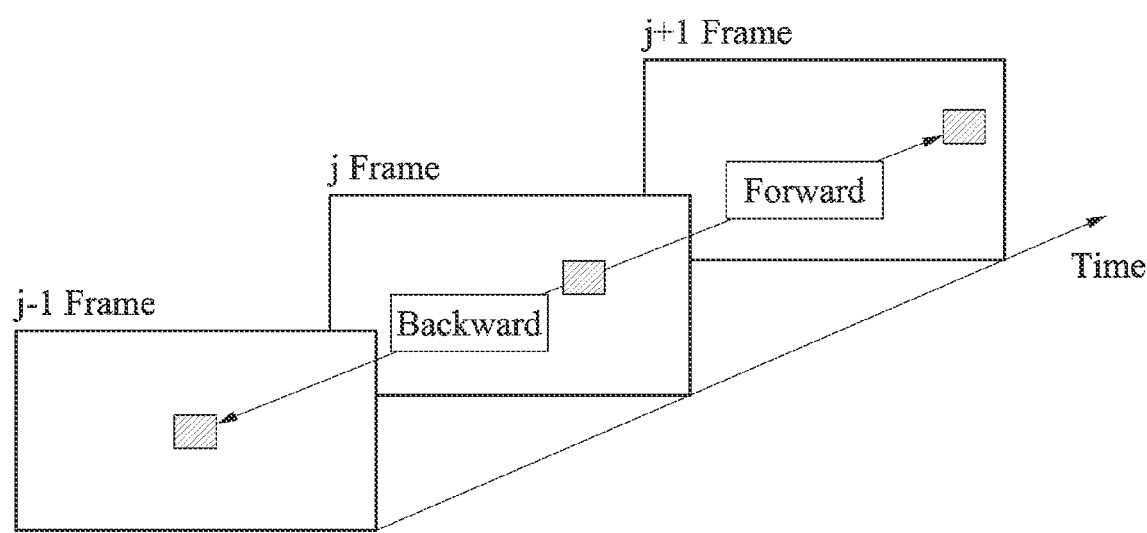
FIG. 5 is a diagram illustrating an example of optical flow information according to an example embodiment.

[Estimation of pixel-unit optical flow information between frames]: The image processing device may estimate pixel-unit optical flow information between images of the frames of I based on video data 350 from which a rotation is removed in operation 355. FIG. 5 is a diagram illustrating an example of optical flow information according to an example embodiment. Referring to FIG. 5, the optical flow information may include forward and backward optical flow information.

Figure 6A:
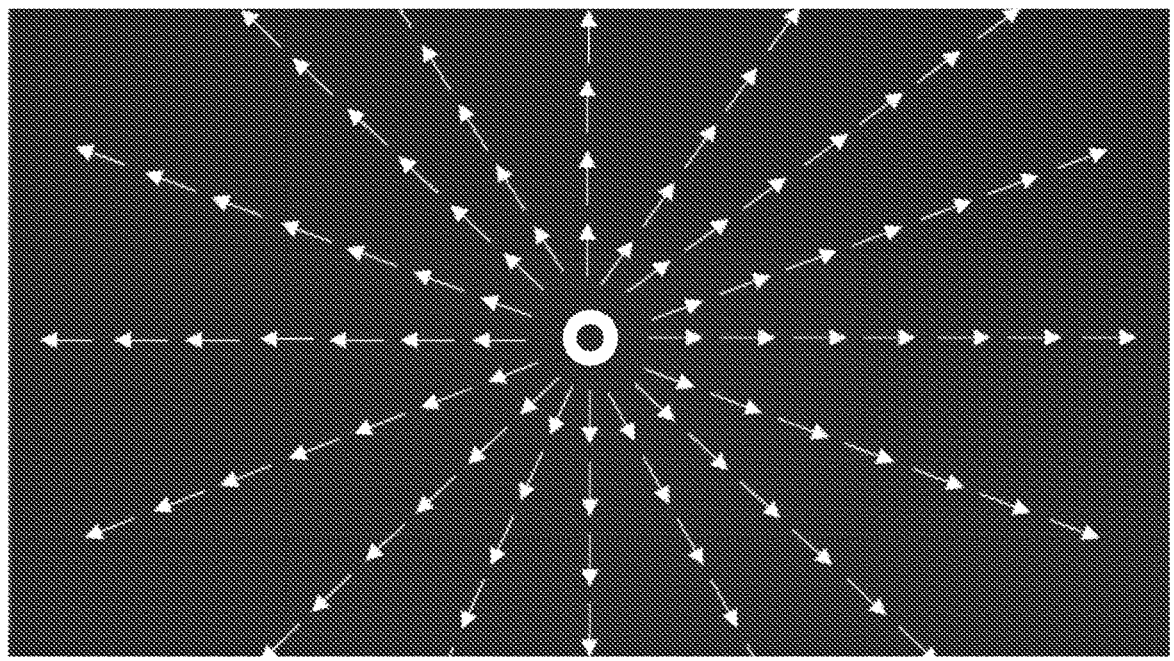
FIG. 6A is a diagram illustrating an example of a motion pattern in a general image.
Figure 6B:
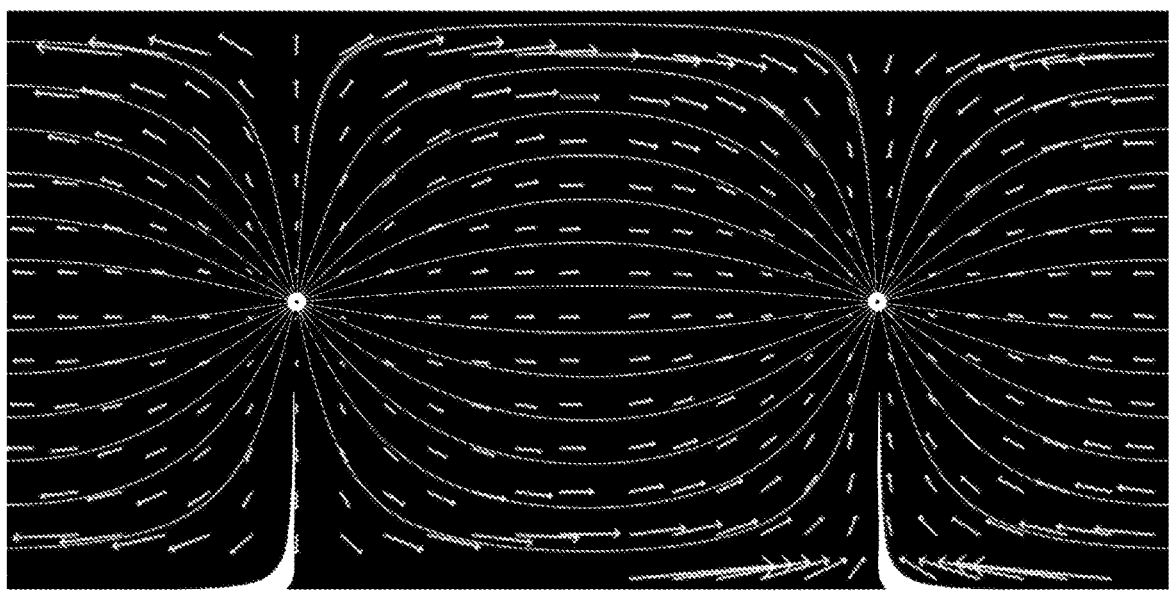
FIG. 6B is a diagram illustrating an example of a motion pattern in a panorama coordinate system according to an example embodiment.

[2D polynomial model estimation]: FIG. 6A is a diagram illustrating an example of a motion pattern in a general image, and FIG. 6B is a diagram illustrating an example of a motion pattern in a panorama coordinate system according to an example embodiment. Dissimilar to the motion pattern shown in the general image in FIG. 6A, the motion pattern in the panorama coordinate system in FIG. 6B may be distorted. Referring to Equation 3 below, the image processing device may construct an A matrix in a polynomial form corresponding to a motion pattern that reflects therein such a motion distortion shown in the panorama coordinate system, and estimate a 2D polynomial model optimized for a spherical coordinate system to minimize a difference between a modeling value (or an interpolation value) based on the A matrix and a measured optical flow information vector $\bar{v}$ in operation 360.

$$c^* = \arg\min_c \ \|Ac - \bar{v}\|_2 \qquad \text{Equation 3}$$

In Equation 3, c denotes a vector including an angle-unit correlation coefficient in the spherical coordinate system.

[Interpolated optical flow information generation]: The image processing device may interpolate optical flow information of a mask region that requires inpainting editing by using the estimated 2D polynomial model. This polynomial model may be applicable based on an angle of the spherical coordinate system and may thus be applied irrespective of the magnitude of an image resolution.

[Panorama image inpainting]: The image processing device may perform inpainting editing by backtracking a pixel value from multiple frames using interpolated optical flow information 365 in operation 370. For example, the image processing device may search for a pixel in another frame having color information based on optical flow information associated with an optical flow toward a pixel in a mask region and/or optical flow information having a pixel in the mask region as a starting point. Thus, an inpainted 360° panorama video may be output through the inpainting editing in operation 380.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. An image processing method, comprising:
receiving sequential frames of an input video, wherein each of the sequential frames includes a first region and a second region, wherein the first region comprises a hole to be removed and wherein the second region excludes the first region;
removing a rotation between the sequential frames by applying an inverse matrix of a rotation transformation matrix corresponding to feature points extracted from a frame pair among the sequential frames to a feature point of a frame in the frame pair;
estimating first optical flow information of pixels in the second region of the sequential frames with the rotation removed;
estimating a polynomial model corresponding to the first optical flow information;
estimating second optical flow information of pixels in the first region of the sequential frames by interpolating the first optical flow information based on the polynomial model, wherein the second optical flow information is different from the first optical flow information;
searching optical flow information toward a first pixel in the first region of a first frame in the sequential frames and optical flow information having the first pixel as a starting point, based on the first optical flow information and the second optical flow information; and
inpainting the input video at the first region by estimating color information of the first pixel based on color information of a second pixel of a second frame in the sequential frames according to the optical flow information toward the first pixel and color information of a third pixel of a third frame in the sequential frames according to the optical flow information having the first pixel as the starting point.

2. The image processing method of claim 1, wherein the estimating of the polynomial model comprises:
estimating a correlation coefficient in the polynomial model based on a motion pattern corresponding to a coordinate system of the input video and the first optical flow information.

3. The image processing method of claim 2, wherein the polynomial model is modeled as a product of a matrix corresponding to the motion pattern and a vector corresponding to the correlation coefficient.

4. The image processing method of claim 3, wherein the estimating of the correlation coefficient comprises:
estimating the correlation coefficient such that a difference between a value of the polynomial model and a value of the first optical flow information is minimized.

5. The image processing method of claim 1, wherein the removing comprises:
computing the rotation transformation matrix by matching the feature points extracted from the frame pair.

6. The image processing method of claim 1, further comprising:
generating inpainting mask data indicating the hole based on the sequential frames, wherein the inpainting comprises:
inpainting the input video based further on the inpainting mask data.

7. The image processing method of claim 1, wherein the estimating of the first optical flow information comprises:
estimating a vector indicating an optical flow between a pixel in one frame of the sequential frames and pixels in remaining frames of the sequential frames excluding the one frame, the vector corresponding to the pixel in the one frame.

8. The image processing method of claim 1, wherein the input video comprises 360-degree (°) panorama video data.

9. A non-transitory computer-readable storage medium storing instructions that, when executed by a processor, cause the processor to perform the image processing method of claim 1.

10. An image processing device, comprising:
a receiver configured to receive sequential frames of an input video, wherein each of the sequential frames includes a first region and a second region, wherein the first region comprises a hole to be removed and wherein the second region excludes the first region;

a preprocessor configured to remove a rotation between the sequential frames by applying an inverse matrix of a rotation transformation matrix corresponding to feature points extracted from a frame pair among the sequential frames to a feature point of a frame in the frame pair, an estimator configured to
  estimate first optical flow information of pixels in the second region of the sequential frames,
  estimate a polynomial model corresponding to the first optical flow information,
  estimate second optical flow information of pixels in the first region of the sequential frames by interpolating the first optical flow information based on the polynomial model, wherein the second optical flow information is different from the first optical flow information, and
  search optical flow information toward a first pixel in the first region of a first frame in the sequential frames and optical flow information having the first pixel as a starting point, based on the first optical flow information and the second optical flow information; and an inpainter configured to inpaint the input video at the first region by estimating color information of the first pixel based on color information of a second pixel of a second frame in the sequential frames according to the optical flow information toward the first pixel and color information of a third pixel of a third frame in the sequential frames according to the optical flow information having the first pixel as the starting point.

11. The image processing device of claim 10, wherein the estimator is configured to:
  estimate the polynomial model by estimating a correlation coefficient in the polynomial model based on a motion pattern corresponding to a coordinate system of the input video and the first optical flow information.

12. The image processing device of claim 11, wherein the polynomial model is modeled as a product of a matrix corresponding to the motion pattern and a vector corresponding to the correlation coefficient.

13. The image processing device of claim 10, wherein the preprocessor is configured to:
  compute the rotation transformation matrix by matching the feature points extracted from the frame pair.

14. The image processing device of claim 10, wherein the inpainter is configured to:
  inpaint the input video based further on inpainting mask data indicating the hole.

15. The image processing device of claim 10, wherein the estimator is configured to:
  estimate the first optical flow information by estimating a vector indicating an optical flow between a pixel in one frame of the sequential frames and pixels of remaining frames of the sequential frames excluding the one frame, the vector corresponding to the pixel in the one frame.

16. The image processing device of claim 10, wherein the input video comprises 360-degree (°) panorama video data.

* * * * *